C. H. B. KELLOGG.
Horse Hay-Fork.
No. 83,068. Patented Oct. 13, 1868.
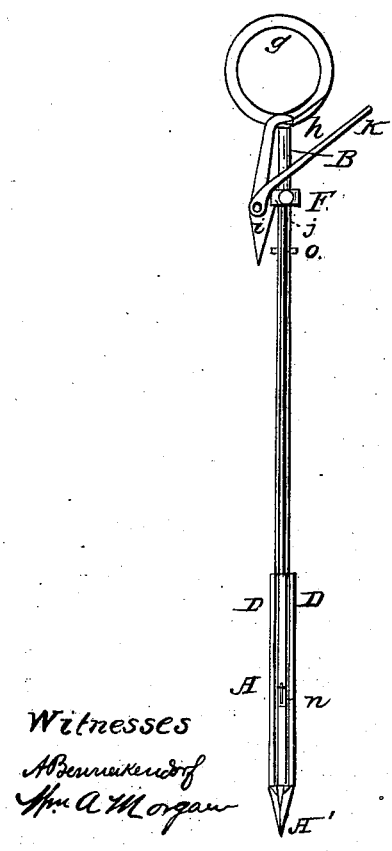
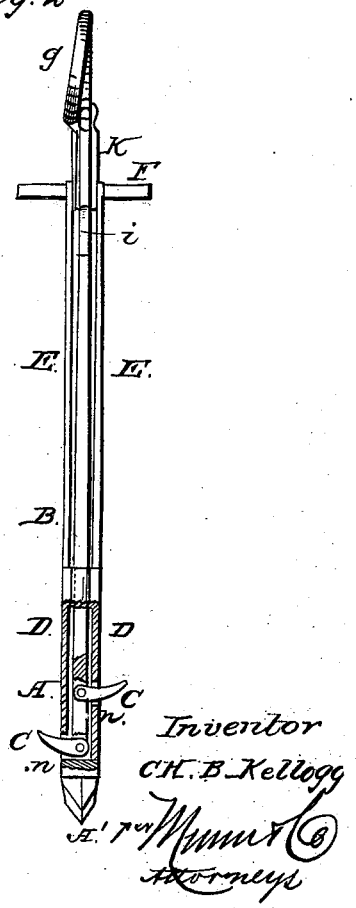
Witnesses
Inventor
C. H. B. Kellogg

C. H. B. KELLOGG, OF TONTOGANY, OHIO.

Letters Patent No. 83,068, dated October 13, 1868.

IMPROVEMENT IN HORSE HAY-FORKS.

The Schedule referred to in these Letters Patent and making part of the same.

*To all whom it may concern:*

Be it known that I, C. H. B. KELLOGG, of Tontogany, in the county of Wood, and State of Ohio, have invented a new and improved Hay-Fork; and I do hereby declare that the following is a full, clear, and exact description thereof, which will enable those skilled in the art to make and use the same, reference being had to the accompanying drawings, forming part of this specification.

This invention relates to a new improvement to facilitate the handling of hay; and it consists in expanding and contracting hooks or tines, attached to a central movable rod, in the manner hereinafter described.

Figure 1 represents a longitudinal edge view of the article.

Figure 2 is a longitudinal side view, partly in section.

Similar letters of reference indicate corresponding parts.

A is the head or casing, which encloses the tines when they are withdrawn or contracted.

This head terminates in a sharp spear-shaped point, of steel, A'.

The sides of the head are made of metal plates, swaged to the proper shape, for admitting the central rod, and the hooks or tines.

B is the central rod.

C represents the hooks or tines.

D represents the sides of the head A.

E E are two rods, which are firmly attached to the head A, and extend up on each side of the central rod B, and parallel thereto, and are secured to a handle, F, as seen in the drawing.

The central rod B passes through a hole in the centre of this handle.

The central rod extends up a short distance above the handle, where there is a bend, at right angles with the rod below, which bend forms a resting-place for the coil $g$, as seen at $h$.

After forming the coil $g$, which is a spring, the end of the rod extends down, and forms a catch, $i$, which catches under the handle, as seen at J, which holds the tines C C extended as seen in the drawing.

K is a lever, for throwing the catch off the handle, and releasing the hay.

The hooks or tines C C are attached to the central rod, by joint-pins, as seen at $m\ m$.

They pass through slots in the casing A, when they are extended, as seen in the drawing at $n\ n$, and they are extended or withdrawn as the central rod, B, is raised or lowered.

$o$ represents a stop-pin.

The operation of the fork in handling hay will be readily understood from the drawing.

The fork is thrust into the hay by crowding on the handle, while the hooks C are sheathed in the case or head.

The rod B is then pushed down, which extends the hooks C, and throws the catch $i$ under the handle, so that the hay thus secured may be lifted by horse-power, or otherwise, and moved to the desired location, when the catch $i$ is withdrawn from the handle by pulling a rope attached to the lever K, which discharges the hay.

I claim as new, and desire to secure by Letters Patent—

A hay-fork, constructed and operating substantially as shown and described, that is to say, with the head A, central rod B, hooks C C, rods E E, catch $i$, and lever K, arranged substantially as described for the purposes set forth.

The above specification of my invention signed by me, this 10th day of August, 1868.

C. H. B. KELLOGG.

Witnesses:
L. BLACK,
GEO. W. MOORE.